US011620604B2

(12) United States Patent
Narayanaswamy et al.

(10) Patent No.: US 11,620,604 B2
(45) Date of Patent: Apr. 4, 2023

(54) SYSTEM AND METHOD FOR MANAGEMENT OF A TALENT NETWORK

(71) Applicant: Hi5Talent LLC, Bloomfield Hills, MI (US)

(72) Inventors: Karthikeyan Narayanaswamy, Bloomfield Hills, MI (US); Ram Narayanan, Canton, MI (US)

(73) Assignee: Hi5Talent LLC, Bloomfield Hills, MI (US)

( * ) Notice: Subject to any disclaimer, the term of this patent is extended or adjusted under 35 U.S.C. 154(b) by 0 days.

(21) Appl. No.: 17/229,960

(22) Filed: Apr. 14, 2021

(65) Prior Publication Data

US 2022/0198366 A1 Jun. 23, 2022

Related U.S. Application Data

(63) Continuation of application No. 17/128,640, filed on Dec. 21, 2020.

(51) Int. Cl.
*G06Q 10/06* (2012.01)
*G06F 40/20* (2020.01)
(Continued)

(52) U.S. Cl.
CPC ....... *G06Q 10/06398* (2013.01); *G06F 40/20* (2020.01); *G06N 20/00* (2019.01); *G06Q 50/01* (2013.01)

(58) Field of Classification Search
CPC .. G06Q 10/06398; G06Q 50/01; G06N 20/00; G06F 40/20
(Continued)

(56) References Cited

U.S. PATENT DOCUMENTS 10,042,939 B2 8/2018 Sinha et al.
10,223,646 B1 3/2019 Vontobel et al.
(Continued)

FOREIGN PATENT DOCUMENTS

KR 102149371 B1 8/2020

OTHER PUBLICATIONS

"Assessing Professional Skills in a Multi-scale Environment by Means of Graph-Based Algorithms", Alvarez-Rodriguez, 2014 (Year: 2014).*

*Primary Examiner* — Charles Guiliano
*Assistant Examiner* — Po Han Lee
(74) *Attorney, Agent, or Firm* — Jason C. Cameron

(57) ABSTRACT

A system and method for management of a talent network are disclosed. The system includes an expert ranking measurement subsystem configured to compute a quantitative score of an expert for a user query based on a talent metric and a trust metric, a qualitative score measurement subsystem configured to compute a qualitative score of the expert based on a content score and an activity score, wherein the content score is computed based on a content provided by the expert and the activity score is computed based on an activity occurring on a profile of the expert, an overall expert rank calculation subsystem configured to calculate an overall rank of the expert, wherein the overall expert rank is calculated based on the quantitative score, the qualitative score, predefined weightages assigned to the connection relationship, the plurality of professional achievements, the content score, the activity score, and user preferences.

11 Claims, 6 Drawing Sheets

(51) Int. Cl.
*G06Q 50/00* (2012.01)
*G06N 20/00* (2019.01)
*G06Q 10/0639* (2023.01)

(58) Field of Classification Search
USPC .......................................................... 705/7.42
See application file for complete search history.

(56) References Cited

U.S. PATENT DOCUMENTS

2012/0190386 A1* 7/2012 Anderson ............... G01S 19/14 455/456.3
2014/0082072 A1 3/2014 Kass et al.
2014/0310037 A1* 10/2014 Griffin ............... G06Q 10/0631 705/7.12
2016/0035046 A1* 2/2016 Gupta ................... H04L 67/306 705/7.29
2016/0162578 A1* 6/2016 Nandakumar ......... G06Q 50/01 707/748
2016/0203140 A1 7/2016 Paul
2017/0228710 A1* 8/2017 Lee ...................... G06Q 20/322
2017/0286865 A1* 10/2017 Fang .................... G06Q 10/105
2018/0150571 A1 5/2018 Douglas et al.
2018/0349484 A1* 12/2018 Carlisle ............... G06F 16/9535
2019/0303807 A1* 10/2019 Gueye ................ G01C 21/3679
2020/0104418 A1* 4/2020 Lei .................... G06F 16/90348
2021/0042854 A1* 2/2021 Hazy ..................... H04L 67/306
2021/0092550 A1* 3/2021 Ganesan .............. G06Q 20/327

* cited by examiner

SYSTEM AND METHOD FOR MANAGEMENT OF A TALENT NETWORK

CROSS REFERENCE TO RELATED APPLICATIONS

The present application is related to and claims priority to the following co-pending application, the entirety of which is incorporated by reference herein: U.S. Non-Provisional patent application Ser. No. 17/128,640 entitled "A SYSTEM AND METHOD FOR MANAGEMENT OF A TALENT NETWORK" filed Dec. 21, 2020.

FIELD OF INVENTION

Embodiments of a present disclosure relates to a talent network, and more particularly to a system and method for management of a talent network.

BACKGROUND

Talent networks are a method of social recruiting. Assembling the talent network means putting together groups of users to help anticipate future hiring needs. A talent network also creates a pipeline of qualified experts who have already expressed an interest in one or more skills and are eager to apply to relevant positions. Members of a talent network often include candidates who are actively or passively seeking work and candidates who are actively or passively seeking help for the completion of a work.

Traditionally, systems which are available for the management of a talent networks show only various skills of the user to the members seeking help, which makes it very difficult for the members to analyze trustability of the expert to perform a particular task. Further, the system uses tabular data for the management of a talent networks, which requires significant human intervention. Handling such large amounts of data becomes a very difficult and time-consuming process. Moreover, typical systems use predefined parameters for the users to select from, while looking for an expert or a candidate in the talent network. This characteristic makes the system very limited in terms of providing options and customization in accordance with various preferences of the users, specifically trustability. Hence, there is a need for a system and method for management of a talent network in order to address the aforementioned issues.

BRIEF DESCRIPTION

In accordance with an embodiment of the disclosure, a system for management of a talent network is disclosed. The system includes one or more processors. The system includes an expert ranking measurement subsystem operable by the one or more processors. The expert ranking measurement subsystem includes a quantitative score measurement subsystem operable by the one or more processors. The quantitative score measurement subsystem is configured to compute a quantitative score of an expert for a user query based on a talent metric and a trust metric, wherein the trust metric is computed based on a connection relationship between the expert and a user in the talent network, and wherein the talent metric is computed based on a plurality of professional achievements of the expert in the talent network.

The expert ranking measurement subsystem also includes a qualitative score measurement subsystem operable by the one or more processors. The qualitative score measurement subsystem is configured to compute a qualitative score of the expert based on a content score and an activity score of the expert in the talent network, wherein the content score is computed based on a content provided by the expert in the talent network, and wherein the activity score is computed based on an activity occurring on a profile of the expert in the talent network. The expert ranking measurement subsystem also includes an overall expert rank calculation subsystem operable by the one or more processors. The overall expert rank calculation subsystem is configured to calculate an overall rank of the expert, wherein the overall expert rank is calculated based on the quantitative score, the qualitative score, predefined weightages assigned to the connection relationship, the plurality of professional achievements, the content score, the activity score, and user preferences.

In accordance with another embodiment of the disclosure, a method for management of a talent network is disclosed. The method includes computing a quantitative score of an expert for a user query based on a talent metric and a trust metric, wherein the trust metric is computed based on a connection relationship between the expert and a user in the talent network, and wherein the talent metric is computed based on a plurality of professional achievements of the expert in the talent network.

The method includes computing a qualitative score of the expert based on a content score and an activity score of the expert in the talent network, wherein the content score is computed based on a content provided by the expert in the talent network, and wherein the activity score is computed based on an activity occurring on a profile of the expert in the talent network. The method includes calculating an overall rank of the expert, wherein the overall expert rank is calculated based on the quantitative score, the qualitative score, predefined weightages assigned to the connection relationship, the plurality of professional achievements, the content score, the activity score, and user preferences.

In yet another embodiment, a method of management of a talent network is disclosed. The method includes creating a plurality of micro networks corresponding to each of a plurality of users in the talent network, wherein each micro network is owned by a corresponding micro network owner, and wherein each micro network comprises one or more users having a first degree of connection with the micro network owner in the talent network. The method also includes onboarding the one or more users within micro network of the micro network owner, as an expert by nominating the one or more users as an expert by providing a first time recognition to the one or more users for one or more skills. The method further includes creating a trusted expert relationship between the expert and the one or more users within the micro network of the micro network owner providing the first time recognition. The method also includes displaying the expert to one or more users based on the trusted expert relationship created between the expert and the one or more users upon receiving a search query for an expert in one or more skills from the one or more users.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Figure 1:
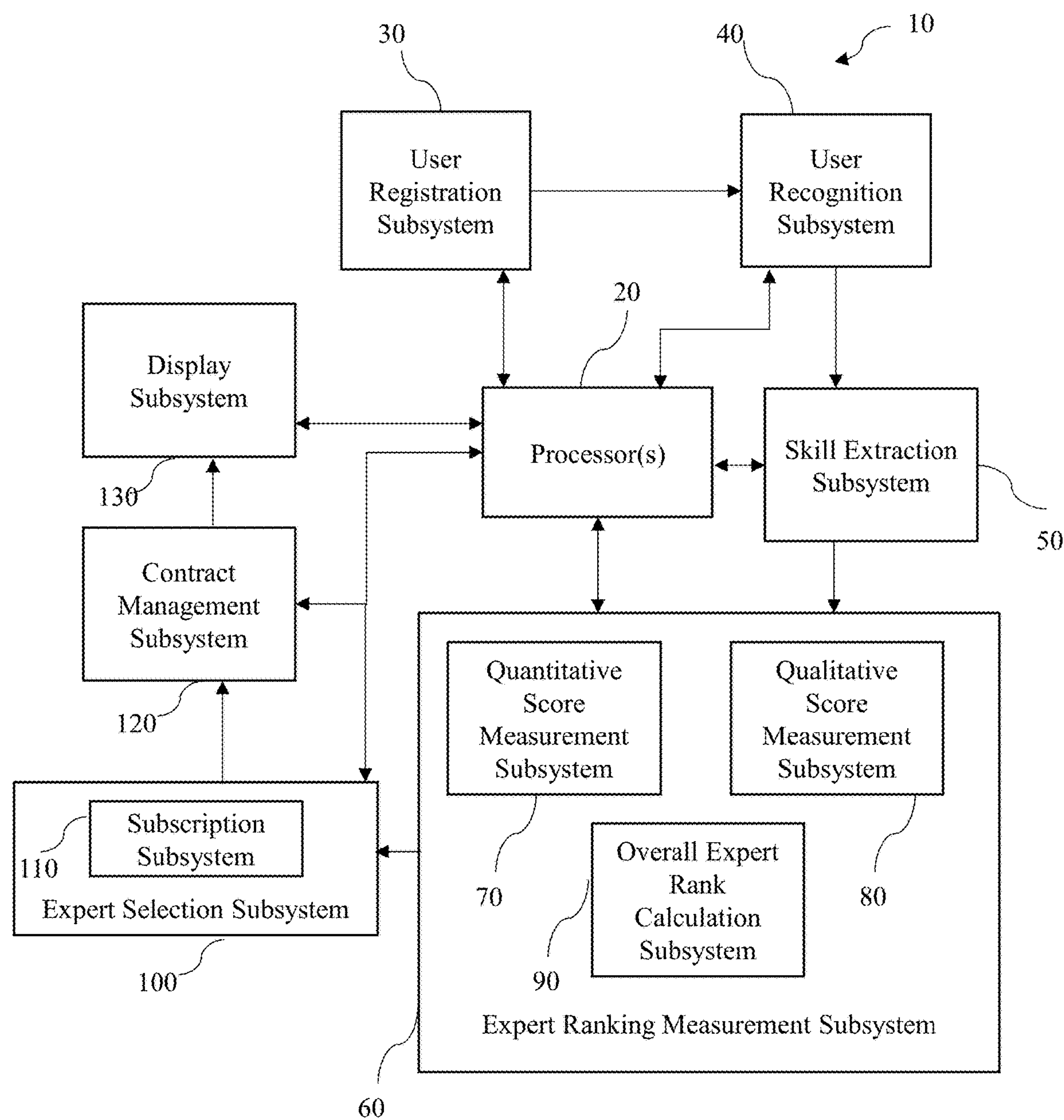
FIG. 1 is a block diagram representation of a system for management of a talent network in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures, and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or sub-systems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system for management of a talent network is disclosed. The system includes one or more processors. The system includes an expert ranking measurement subsystem operable by the one or more processors. The expert ranking measurement subsystem includes a quantitative score measurement subsystem operable by the one or more processors. The quantitative score measurement subsystem is configured to compute a quantitative score of an expert for a user query based on a talent metric and a trust metric, wherein the trust metric is computed based on a connection relationship between the expert and a user in the talent network, and the talent metric is computed based on a plurality of professional achievements of the expert in the talent network.

The expert ranking measurement subsystem also includes a qualitative score measurement subsystem operable by the one or more processors. The qualitative score measurement subsystem is configured to compute a qualitative score of the expert based on a content score and an activity score of the expert in the talent network, wherein the content score is computed based on content provided by the expert in the talent network, and the activity score is computed based on an activity occurring on a profile of the expert in the talent network. The expert ranking measurement subsystem also includes an overall expert rank calculation subsystem operable by the one or more processors. The overall expert rank calculation subsystem is configured to calculate an overall rank of the expert, wherein the overall expert rank is calculated based on the quantitative score, the qualitative score, predefined weightages assigned to the connection relationship, the plurality of professional achievements, the content score, the activity score, and user preferences.

FIG. 1 is a block diagram representation of a system 10 for management of a talent network in accordance with an embodiment of the present disclosure. The system 10 may include a mobile application, a web application, and the like. The system 10 may be hosted on a server. In one embodiment, the server may include a cloud server. The system 10 includes one or more processors 20. In one embodiment, the system 10 may include a user registration subsystem 30 operable by the one or more processors 20. The user registration subsystem 30 registers one or more users in the system 10 based on one or more details received by the one or more users. In one embodiment, the one or more users may include one or more members, one or more experts, and the like. In another embodiment, the one or more details may include contact information, one or more skills associated with the one or more experts, one or more problems associated with the one or more users, and the like.

Further, in one embodiment, a user may provide the contact information associated with the user to a non-user for registering on the platform. In such an embodiment, the user registration subsystem 30 may generate a signal for the non-user, wherein the signal may include a link for registering on the platform. In one embodiment, the signal may include a quick response code, a short message service, a similar readable code, and the like. In one embodiment, when a new user registers on the platform using the signal provided by the user registration subsystem 30, then the new user may be added to a first degree of connection of the user.

As used herein, the term 'first degree of connection' refers to a one to one network connection between two users.

Further in one embodiment, one or more users may be added to the first degree of connections using a device based gesture. For example, two users may execute a signature gesture using one or more devices associated with the two users via one or more connecting means to share the contact information between the two users. In such an embodiment, the signature gesture may include moving the device up and down, shaking the device, and the like. In another embodiment, the one or more connecting means may include Bluetooth, near field communication (NFC), and the like. In one embodiment, the two users may share a business card electronically between the devices associated with the two users through the platform. In one embodiment, the two devices may be within a distance of one meter or less. In one specific embodiment, after sharing the contact information, the two users may be added to each other's first degree of connection. Moreover, in another embodiment, the one or more users may import a list of contacts from the one or more devices associated with the one or more users to add various users from other networks as the first degree of connection with the one or more users.

Further, the system 10 may include a user recognition subsystem 40 communicatively coupled to the user registration subsystem 30 and operable by the one or more processors 20. The user recognition subsystem 40 recognizes the one or more users as the one or more experts by recognizing the one or more skills of the one or more users. In one embodiment, a user who wants to be an expert may provide a list of tasks the user has completed, the list of problems the user has solved, and the like to be recognized by the one or more members for which the user has completed the one or more tasks. In such an embodiment, the one or more tasks may include one or more professional tasks, one or more personal tasks, and the like. In one embodiment, if the one or more members does not send a recognition, then the recognition request may be ignored by the user recognition subsystem 40. In another embodiment, if the one or more members sends a recognition for the user, then the user may be onboarded as the expert on the platform.

Further, in one embodiment, the one or more experts may also receive recognition on the one or more skills associated with the one or more experts. In another embodiment, the one or more users may share the recognition given to the one or more experts to their first degree of connections, second degree of connections, one or more friends, and the like. In yet another embodiment, the one or more experts may utilize the recognition received to market their profile in the talent network. In one specific embodiment, the one or more experts may send a recognition request to one or more non-members in the talent network to receive the recognition for the one or more tasks the one or more experts completed for the one or more non-members. In one embodiment, the expert may provide recognition to another expert who completed the task associated with the expert. The user recognition subsystem registers the recognitions in a directory format and can provide this information to a user relative to their trust relationship to the expert for all available skills and topics of recognition Further, the system 10 may include a skill extraction subsystem 50 communicatively coupled to the expert recognition subsystem 40 and operable by the one or more processors 20. The skill extraction subsystem 50 extracts one or more skill sets from the one or more tasks completed by the one or more experts using one or more natural language processing techniques and one or more artificial intelligence techniques. In one embodiment, a permanent record of every task completed by the expert is stored in a verifiable blockchain. In one embodiment, the skill extraction subsystem 50 may generate a list of skills used by the expert in a particular task.

Further, the system 10 includes an expert ranking measurement subsystem 60 operable by the one or more processors 20. The expert ranking measurement subsystem 60 includes a quantitative score measurement subsystem 70 operable by the one or more processors 20. The quantitative score measurement subsystem 70 computes a quantitative score of an expert for a user query based on a talent metric and a trust metric, wherein the trust metric is computed based on a connection relationship between the expert and a user in the talent network, and the talent metric is computed based on a plurality of professional achievements of the expert in the talent network. In such an embodiment, the plurality of professional achievements may include a number of recognitions the expert has received, a number of successful tasks, a number of goals the expert has achieved, a combination thereof, and the like. In another embodiment, the connection relationship may include a degree of connection of the expert with the user. As used herein, a degree of connection may be defined as a number of nodes between two users. For example, people directly connected to a user in the talent network may be defined as first degree of connection. The first degree of connections are people who have either accepted a user's invitation to connect with him or the user has accepted their invitation to connect with them on the talent network. Similarly, a second degree of connection with respect to the user would be a third person who is connected to the person directly connected to the user. Although, the third person and the user are not connected to each other. Similarly, other degree of connections can be determined. In one specific embodiment, the number of goals may include one or more completed documented tasks completed by the one or more experts, one or more contracts, and the like. As used herein, the term "user query" refers to a query provided by the user to the system for searching for an expert in a particular field or having a particular skill set in the talent network.

Further in one embodiment, the trust metric score may vary in accordance with a degree of connection. In such an embodiment, the score may vary whether the recognition received by the expert is from the first degree of connection or the second degree of connection. In one exemplary embodiment, the trust metric value may be three when the expert is recognized by the first degree of connection and the trust metric value may be two when the expert is recognized by the second degree of connection. The recognition can only be received from a first degree of connection (i.e. within the micro-network). In another embodiment, the quantitative score may be calculated as a product of the talent metric and the trust metric.

Further, the expert ranking measurement subsystem 60 includes a qualitative score measurement subsystem 80 operable by the one or more processors 20. The qualitative score measurement subsystem 80 computes a qualitative score of the expert based on a content score and an activity score of the expert in the talent network. In, such an embodiment, the content score may be computed based on a content provided by the expert in the talent network and the activity score may be computed based on an activity occurring on a profile of the expert in the talent network. In another embodiment, the content may include at least two of a profile of the expert in the talent network, a plurality of images uploaded by the expert, a plurality of videos uploaded by the expert, one or more confirmed contracts obtained by the expert, one or more certificates uploaded by the expert, a combination thereof, and the like.

Further, in yet another embodiment, the activity may include at least two of a number of likes received by the expert, a number of views received by the expert, a number of shares received by the expert, a combination thereof, and the like. In one specific embodiment, predefined weightages may be assigned in real time for each case based on trained machine learning models. In one specific embodiment, the qualitative score measurement subsystem 80 may use one or more machine learning algorithms and natural language processing techniques to drive insights from the one or more recognitions received by the one or more experts. In one exemplary embodiment, if the user wants a consultancy engagement, then more weightage may be assigned to the consultancy skill of the one or more experts.

In one embodiment, the qualitative score measurement subsystem 80 may also vary the qualitative score in accordance with the one or more expert inputs, wherein the one or more expert inputs may include a global expert, a local expert, availability of the expert, and the like. In one specific embodiment, the qualitative score measurement subsystem 80 may use one or more techniques to improve the qualitative score. In such an embodiment, the one or more techniques may include a textual analysis, video analysis, image recognition, image processing, and the like. In such an embodiment, the image recognition technique, video analysis, and the image processing technique may help in enhancing the rank of the one or more experts.

Further, the expert ranking measurement subsystem 60 includes an overall expert rank calculation subsystem 90 operable by the one or more processors 20. The overall expert rank calculation subsystem 90 calculates an overall rank of the expert, wherein the overall expert rank is calculated based on the quantitative score, the qualitative score, predefined weightages assigned to the connection relationship, the plurality of professional achievements, the content score, the activity score, and user preferences. In such an embodiment, the user preferences may include one or more details associated with the task to be performed by the expert and one or more rules for delivery of the one or more tasks defined by the user associated with the task. In one embodiment, the overall expert rank may be generated based on a cumulative sum of the quantitative score and the qualitative score.

Further, the system 10 may include an expert selection subsystem 100 communicatively coupled to the expert ranking measurement subsystem 60 and operable by the one or more processors 20. The expert selection subsystem 100 receives an input from the user representative of a selected expert to perform the task associated with the user. In one embodiment, the expert selection subsystem 100 may receive a description of the task to be completed. In another embodiment, the expert selection subsystem 100 may use the natural language processing technique to determine one or more required skills to complete the task. In yet another embodiment, the expert selection subsystem 100 may match the one or more required skills to the one or more skills of the experts in real-time obtained from the skill extraction subsystem 50

Further, the expert selection subsystem 100 generates a list of experts with the one or more required skills in accordance with the overall rank of the one or more experts. In such an embodiment, the expert selection subsystem 100 may generate the list of experts from the first degree of connection and the second degree of connection of the one or more users.

Further, the expert selection subsystem 100 may include a subscription subsystem 110 operable by the one or more processors. The subscription subsystem 110 receives an input representative of a subscription to a specific skill which the one or more users are interested in. In one specific embodiment, the one or more users may receive a feed of one or more activities, one or more proposals by the one or more experts, summaries of the one or more experts in the network connection of the one or more users, summaries of the one or more experts outside the network of the one or more users, and the like, which are associated with the subscription of the specific skill by the one or more users. In another embodiment, the one or more users may be awarded or paid a fee while hiring and recognizing the one or more experts from the feed.

Further, the system 10 may include a blockchain-based contract management subsystem 120 operable by the one or more processors 20. The contract management subsystem 120 executes a contract between the user and the expert until completion of the one or more tasks. In one embodiment, the contract may include a description of the task to be completed, one or more deliverable rules when the task is completed, and the like. In one specific embodiment, after agreement of the contract and the completion of the task, the contract may be considered as completed and counted as an achieved goal and used for future calculation of ranking by the expert ranking measurement subsystem 60.

Further, the system 10 may include a display subsystem 130 operable by the one or more processors 20. The display subsystem 130 displays one or more profiles associated with the one or more users. In one embodiment, the one or more users may manage one or more profiles using the display subsystem 130. In another embodiment, the display subsystem 130 may display a history of the one or more tasks associated with the one or more users, a rank associated with the one or more experts, feed of the one or more users, and the like.

Figure 2:
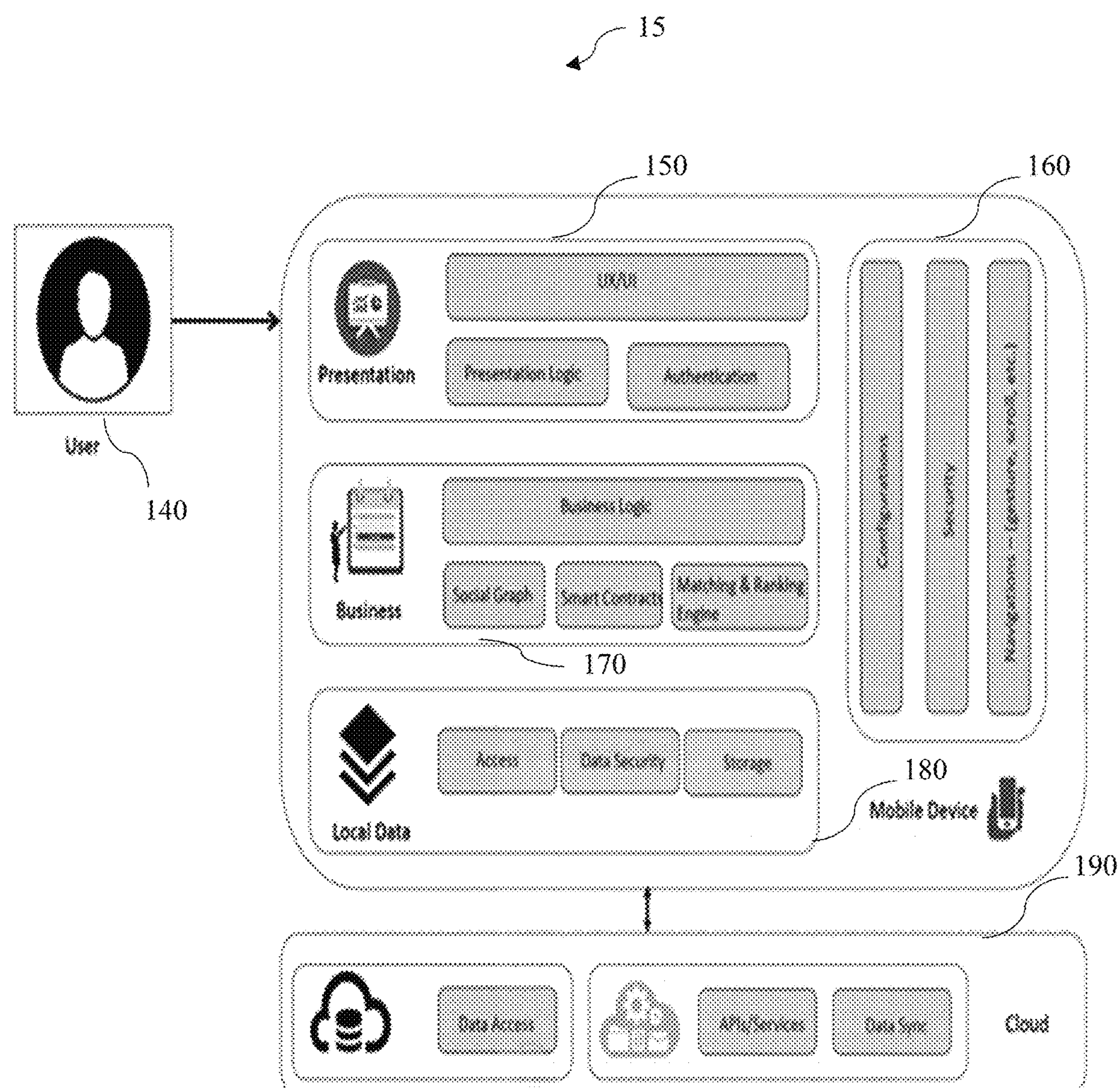
FIG. 2 is an exemplary embodiment representation of a user interface of the system for management of a talent network of FIG. 1 in accordance with an embodiment of the present disclosure.

FIG. 2 is an exemplary embodiment representation of a user interface 15 of the system 10 for management of a talent network of FIG. 1 in accordance with an embodiment of the present disclosure. The user 140 registers on the platform by providing the one or more details via a mobile device by the user registration subsystem 30. The system 10 includes a presentation unit 150 to provide the user interface 15 to the user 140, wherein the presentation unit 150 registers the user 140 after receiving authentication via a phone number from the user 140. Further, the system 10 includes a business unit 170 to provide the user 140 a platform for selecting the expert to perform the task. Moreover, the business unit 170 includes a ranking engine which computes the overall rank of the one or more experts and provide a list of experts to the user 140 to select from by the expert ranking measurement subsystem 60. Further, after selecting the expert by the user 140, the user 140 and the expert agrees to a blockchain-based smart contract for execution and completion of rules associated with the task.

Further, the user interface 15 includes a local data unit 180 to manage data security of the one or more users 140. Moreover, the local data unit 180 also includes a database to store information related to the one or more users 140. Further, the user interface 15 also includes a configuration unit 160 that includes a security unit and a navigation unit to manage one or more activities associated with the one or more users 140. Further, the user interface 15 is hosted on a cloud server 190, wherein the cloud server includes a cloud storage, one or more service, data sync unit, and the like.

Figure 3:
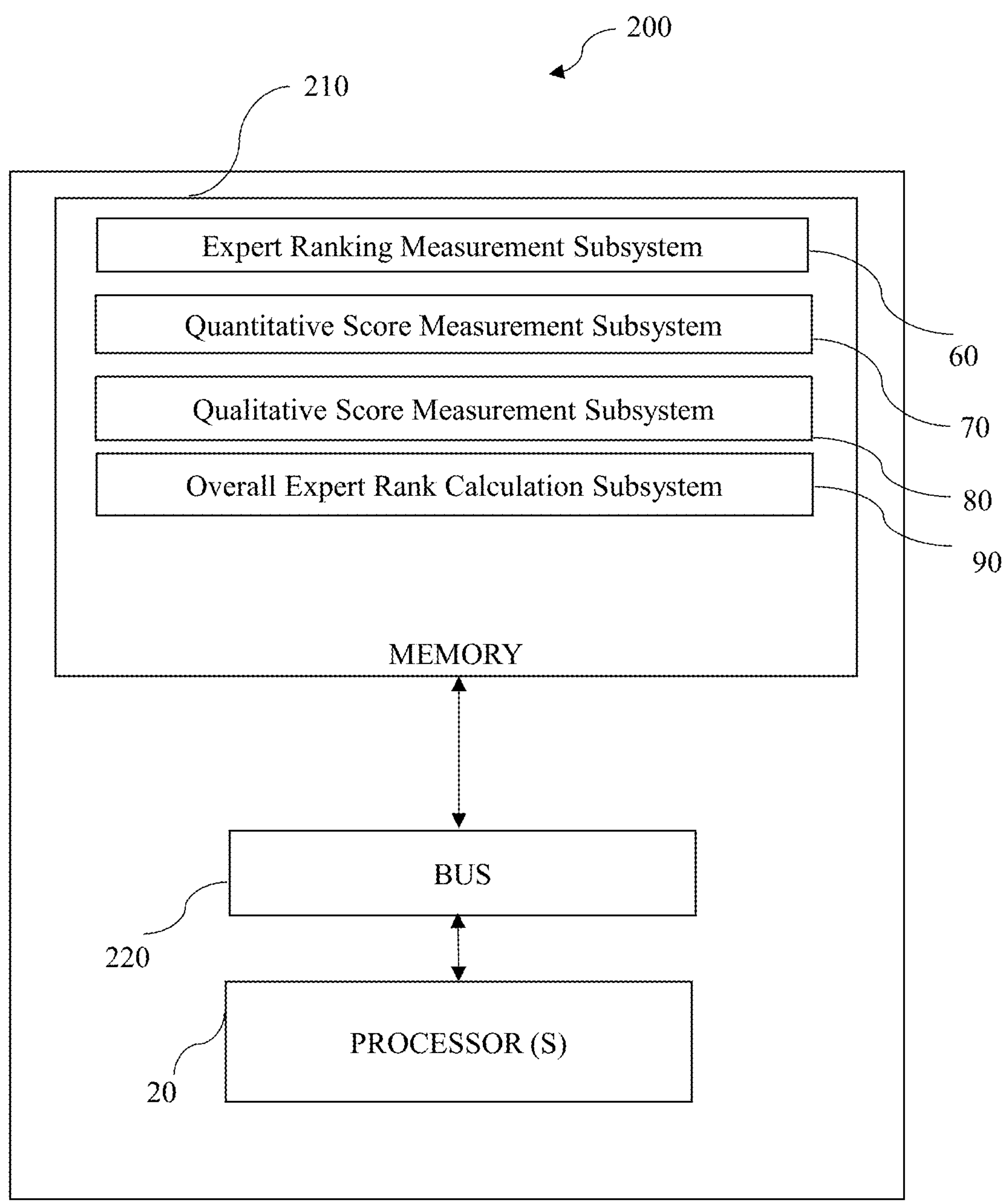
FIG. 3 is a block diagram of management computer system or a server of a talent network in accordance with an embodiment of the present disclosure.

FIG. 3 is a block diagram of a management computer system 200 located on a server of a talent network in accordance with an embodiment of the present disclosure. The computer system 200 includes processor(s) 20 and memory 210 coupled to the processor(s) 20 via a bus 220. The memory 210 is stored locally on a seeker device.

The processor(s) 20, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory includes multiple units stored in the form of executable programs which instructs the processor 20 to perform the configuration of the system illustrated in FIGS. 1 and 2. The memory 210 includes the following units: an expert ranking measurement subsystem 60, a quantitative score measurement subsystem 70, a qualitative score measurement subsystem 80, and an overall rank calculation subsystem 90 as disclosed in FIG. 1.

Computer memory 210 elements may include any suitable memory device(s) for storing data and executable programs, such as read-only memory, random access memory, erasable programmable read-only memory, electrically erasable programmable read-only memory, a hard drive, a removable media drive for handling memory cards, and the like. Embodiments of the present subject matter may be implemented in conjunction with program subsystems including functions, procedures, data structures, and application programs for performing tasks or defining abstract data types or low-level hardware contexts. The executable program stored on any of the above-mentioned storage media may be executable by the processor(s) 20.

The expert ranking measurement subsystem 60 includes a quantitative score measurement subsystem 70. The quantitative score measurement subsystem 70 instructs the processor(s) 20 to compute a quantitative score of an expert for a user query based on a talent metric and a trust metric, wherein the trust metric is computed based on a connection relationship between the expert and a user in the talent network, and the talent metric is computed based on a plurality of professional achievements of the expert in the talent network. The qualitative score measurement subsystem 80 instructs the processor(s) 20 to compute a qualitative score of the expert based on a content score and an activity score of the expert in the talent network, wherein the content score is computed based on a content provided by the expert in the talent network and the activity score is computed based on an activity occurring on a profile of the expert in the talent network. The overall expert rank calculation subsystem 90 instructs the processor(s) 20 to calculate an overall rank of the expert, wherein the overall expert rank is calculated based on the quantitative score, the qualitative score, predefined weightages assigned to the connection relationship, the plurality of professional achievements, the content score, the activity score, and user preferences.

Figure 4:
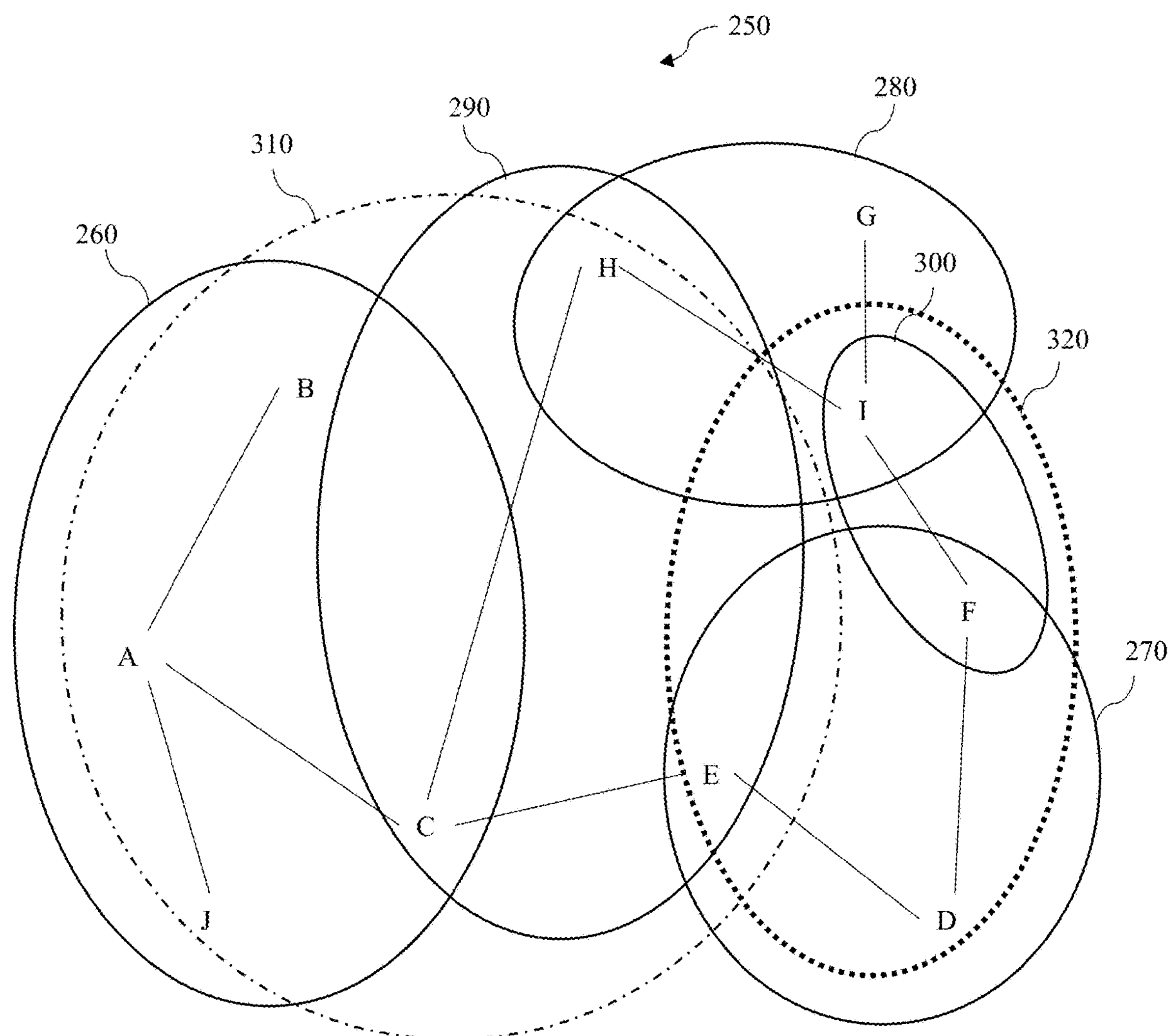
FIG. 4 is a schematic illustration of a plurality of micro networks within the talent network depicting a plurality of users and one or more experts in accordance with an embodiment of the present disclosure.

FIG. 4 is a schematic illustration of a plurality of micro networks within the talent network 250 depicting a plurality of users and one or more experts in accordance with an embodiment of the present disclosure. The talent network 250 includes a plurality of users. The talent network 250 is configured to determine and form a micro network for each user in the talent network 250, where each of the micro network is formed between a first degree of connections (n=1) of each user, where n is the degree of connection with another user of the talent network 250. In one embodiment, the degree of connection for creating the micro network may be more than one. Each micro network is determined based on the corresponding user, i.e., each user of the talent network 250 may have his/her own micro network, in which the user (micro network owner) is the focal point of the micro network and the first degree of connection for creating the micro network is determined by keeping the user as the focal point. Furthermore, each new user in the talent network 250 who connects with the micro network owner is added to the micro network of the micro network owner. Hence, the micro network owner is capable of adding new users in his/her micro network and increase his/her micro network.

The micro network owner may also onboard a user as an expert in the micro network by nominating the user as the expert for one or more skills in his micro network by providing a first time recognition, wherein the expert being nominated may be a first user existing in the micro network of the micro network owner (second user) or a person unlisted in the talent network 250. In one embodiment, the first time recognition may be provided to the first user who is within the first degree of connection of the second user in the talent network 250.

Upon providing the first time recognition and onboarding the user as an expert in the micro network by the micro network owner, the talent network 250 creates a trusted expert (TE) relationship between the expert onboarded by the micro network owner and the users in the micro network of the micro network owner. In such situation, the TE relationship is created with n=2 degree of connections with the expert as the micro network owner is the first degree of connection of the expert and the users in the micro network are second degree of connections of the expert. In embodiments, where the micro network is defined by a higher degree of connections of the micro network owner, the TE relationship created between the users in the micro network and expert will also be adjusted accordingly to create the TE relationship with each user in the micro network of the micro network owner.

Furthermore, one or more users in the micro network of the micro network owner may also recognize the expert for the one or more skills of the expert. In such scenario, the talent network 250 may create a TE relationship with all the additional users provided in the micro network of the one or more users recognizing the expert. Therefore, the expert would be visible and can be searched within all the micro networks, where the expert has been recognized, although the users in each micro network may not overlap with independent micro networks.

For example, the talent network 250 may include nine users, A, B, C, D, E, F, G, H, I. Each of the users may form their micro network in the talent network and be the micro network owner of corresponding micro networks. In this case, user A, user D and user G may have corresponding micro networks 260, 270 and 280 respectively. Users B and C are part of the micro network 260 of user A, users E and F are part of the micro network 270 of user D and users H and I are part of micro network 280 of user G.

Furthermore, user C is connected to user E and user H and has a corresponding micro network 290 including E and H. Also, user F is connected to user I and has user I in its corresponding micro network 300.

Furthermore, any of micro network owners A, D, G, C and F may onboard a new user as an expert in their respective micro networks by providing a first time recognition to the new user. In different embodiments, the new user may exist in the talent network 250 as a user or new user may not be listed in the talent network 250 even as a user.

In the scenario, where new user is not registered in the talent network 250 as a user, user A can nominate the new user (J) via invite and allow J to join the talent network 250 as an expert based on the nomination provided by A. In such case, upon J joining the talent network 250, the talent network 250 creates a trusted expert (TE) relationship with B and C in the micro network 260 of A.

Furthermore, in time, C also recognizes J as an expert, which allows the talent network 250 to create TE relationships between expert J and users E and H in C's micro network 290.

Alternatively, if the new user being nominated exists in the talent network 250, the micro network owner may nominate the existing user as an expert. For example, if D nominates F as an expert by providing the first time recognition, TE relationship of F is created by the talent network 250 with D and E in micro network 270. However, since F also has its own micro network 300, a TE relationship is also created between F and I.

Therefore, in situation where J is recognized as an expert by A and C, J is visible and searchable by users A, B, C, E and H represented by trusted expert network 310 in the talent network 250 based on the TE relationship created over time.

Similarly, in situation, where F is recognized as an expert, F is visible and searchable by users D, E and I represented by trusted expert network 320 in the talent network 250 based on the TE relationship created between them.

It is to be understood that the example disclosed above is non-limiting and only describes one example of operation of the talent network. Many modifications of such examples may be used for using the talent network based on the configurations of the talent network, which may include but no limited to degree of connections of the micro network, degree of connections for creating TE relationship and the like.

Figure 5:
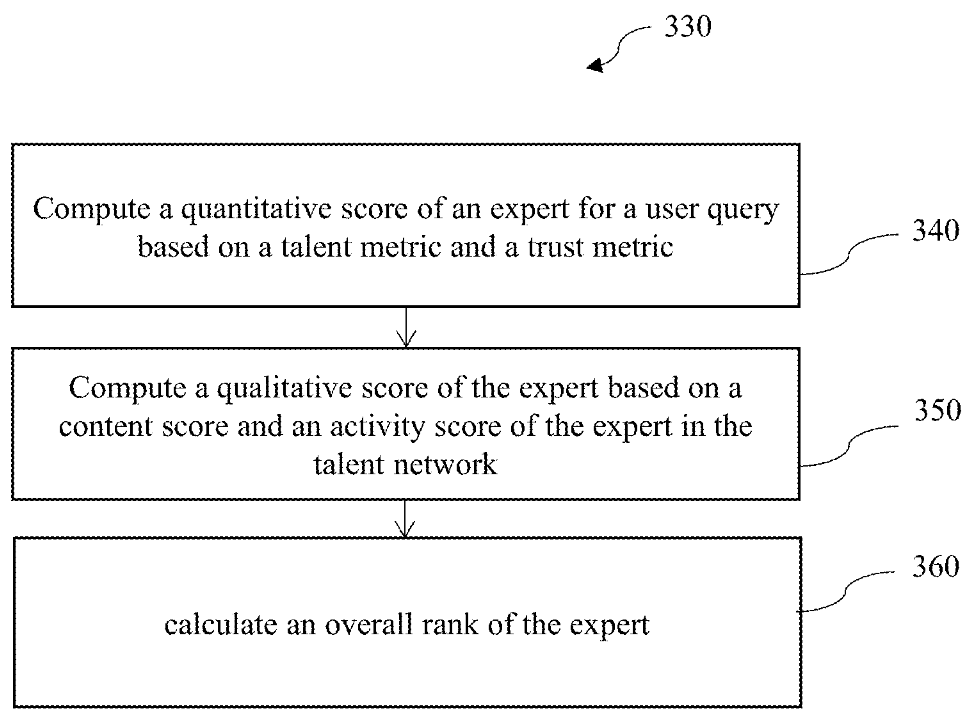
FIG. 5 is a flow diagram representing steps involved in a method for management of a talent network in accordance with an embodiment of the present disclosure.

FIG. 5 is a flow diagram representing the steps involved in a method 330 for management of a talent network in accordance with an embodiment of the present disclosure. The method 330 includes registering, by a user registration subsystem, one or more users in the system 10 based on one or more details received by the one or more users. In one embodiment, registering the one or more users may include registering one or more members, one or more experts, and the like. In another embodiment, using the one or more details may include using contact information, one or more skills associated with the one or more experts, one or more problems associated with the one or more users, and the like.

Further, in one embodiment, the method 330 may include providing the contact information associated with the user to a non-user for registering on the platform. In such an embodiment, the method 330 may include generating a signal for the non-user, wherein the signal may include a link for registering on the platform. In one embodiment, generating the signal may include generating a quick response code, a short message service, a similar readable code, and the like. In one embodiment, the method 330 may include adding the new user to a first degree of connection of the user when a new user registers on the platform using the signal provided by the user registration subsystem.

Further, in one embodiment, the method 330 may include executing a signature gesture using one or more devices associated with the two users via one or more connecting means to share the contact information between the two users. In such an embodiment, executing the signature gesture may include moving the device up and down, shaking the device, and the like. In another embodiment, executing via the one or more connecting means may include executing via Bluetooth, near field communication (NFC) and the like. In one embodiment, the method 330 may include sharing a business card electronically between the devices associated with the two users through the platform. In one embodiment, using the devices may include using the devices within a distance of one meter or less. In one specific embodiment, the method 330 may include adding the two users to each other's first degree of connection after sharing the contact information. In another embodiment, the method 330 may include importing a list of contacts from the one or more devices associated with the one or more users to add various users from other networks as the first degree of connection with the one or more users.

Further, the method 330 may include recognizing, by a user recognition subsystem, the one or more users as the one or more experts by recognizing the one or more skills of the one or more users. In one embodiment, the method 330 may include providing a list of tasks the user has completed, the list of problems the user has solved, and the like to get recognized by the one or more members for which the user has completed the one or more tasks. In such an embodiment, providing the one or more tasks may include providing one or more professional tasks, one or more personal tasks, and the like. In one embodiment, the method 330 may include ignoring by the user recognition subsystem if the one or more members does not send a recognition then the recognition request. In another embodiment, the method 330 may include onboarding the user as an expert on the platform if the one or more members sends a recognition for the user.

Further, in one embodiment, the method 330 may include receiving recognition on the one or more skills associated with the one or more experts. In another embodiment, the method 330 may include sharing the recognition given to the one or more experts to their degree of connections, second degree of connections, one or more friends, and the like. In yet another embodiment, the method 330 may include utilizing the recognition received to market their profile in the talent network. In one specific embodiment, the method 330 may include sending a recognition request to one or more non-members in the talent network to receive the recognition for the one or more tasks the one or more experts completed for the one or more non-members. In one embodiment, the method 330 may include providing recognition to another expert who completed the task associated with the expert.

Further, the method 330 may include extracting, by a skill extraction subsystem, one or more skill sets from the one or more tasks completed by the one or more experts using one or more natural language processing techniques and one or more artificial intelligence techniques. In one embodiment, the method 330 may include storing a permanent record of every task completed by the expert in a verifiable blockchain. In one embodiment, the method 330 may include generating a list of skills used by the expert in a particular task.

Further, the method 330 includes computing, by a quantitative score measurement subsystem, a quantitative score of an expert for a user query based on a talent metric and a trust metric in step 340, wherein the trust metric is computed based on a connection relationship between the expert and a user in the talent network, and the talent metric is computed based on a plurality of professional achievements of the expert in the talent network. In such an embodiment, computing based on the professional achievements may include computing based on a number of recognitions the expert has received, a number of successful tasks, a number of goals the expert has achieved, a combination thereof, and the like. In another embodiment, computing using the number of goals may include computing using one or more completed documented tasks completed by the one or more experts, one or more contracts, and the like.

Further in one embodiment, the method 330 may include varying the score of the trust metric in accordance with a degree of connection. In such an embodiment, the method 330 may include varying the score whether the recognition received by the expert is from the first degree of connection or the second degree of connection. In another embodiment, the method 330 may include calculating the quantitative score as a product of the talent metric and the trust metric.

Further, the method 330 includes computing, by a qualitative score measurement subsystem, a qualitative score of the expert based on a content score and an activity score of the expert in the talent network in step 350. In such an embodiment, the method 330 may include computing the content score based on a content provided by the expert in the talent network, and the activity score may be computed based on an activity occurring on a profile of the expert in the talent network. In another embodiment, computing the content may include computing at least two of a profile of the expert in the talent network, a plurality of images uploaded by the expert, a plurality of videos uploaded by the expert, one or more confirmed contracts obtained by the expert, one or more certificates uploaded by the expert, a combination thereof, and the like.

Further, in yet another embodiment, computing the activity may include computing at least two of a number of likes received by the expert, a number of views received by the expert, a number of shares received by the expert, a combination thereof, and the like. In one specific embodiment, the method 330 may include assigning predefined weightages in real time for each case based on trained machine learning models. In one specific embodiment, the method 330 may include using one or more machine learning algorithms and natural language processing techniques to drive insights from the one or more recognitions received by the one or more experts.

In one embodiment, the method 330 may include varying the qualitative score in accordance with the one or more expert inputs, wherein the one or more expert inputs may include a global expert, a local expert, availability of the expert, and the like. In one specific embodiment, the method 330 may include using one or more techniques to improve the qualitative score. In such an embodiment, using the one or more techniques may include using a textual analysis, video analysis, image recognition, image processing, and the like. In such an embodiment, the method 330 may include enhancing the rank of the one or more experts by using the image recognition technique, video analysis and the image processing technique.

Further, the method 330 includes calculating, by an overall rank calculation subsystem, an overall rank of the expert in step 360, wherein the overall expert rank is calculated based on the quantitative score, the qualitative score, predefined weightages assigned to the connection relationship, the plurality of professional achievements, the content score, the activity score, and user preferences. In such an embodiment, calculating based on the user preferences may include calculating based on one or more details associated with the task to be performed by the expert and one or more rules for delivery of the one or more tasks defined by the user associated with the task. In one embodiment, the method 330 may include generating the overall rank based on a cumulative sum of the quantitative score and the qualitative score.

Further, the method 330 may include receiving, by an expert selection subsystem, an input from the user representative of a selected expert to perform the task associated with the user. In one embodiment, the method 330 may include receiving a description of the task to be completed. In another embodiment, the method 330 may include using the natural language processing technique to determine one or more required skills to complete the task. In yet another embodiment, the method 330 may include matching the one or more required skills to the one or more skills of the experts in real-time.

Further, the method 330 may include generating a list of experts with the one or more required skills in accordance with the overall rank of the one or more experts. In such an embodiment, the method 330 may include generating the list of trusted experts from the first degree of connection and the second degree of connection of the one or more users.

Further, the method 330 may include receiving, by a subscription subsystem, an input representative of a subscription to a specific skill which the one or more users are interested in. In one specific embodiment, the method 330 may include receiving, by the one or more users, a feed of one or more activities, one or more proposals by the one or more experts, summaries of the one or more experts in the network connection of the one or more users, summaries of the one or more experts outside the network of the one or more users, and the like, which are associated with the subscription of the specific skill by the one or more users. In another embodiment, the method 330 may include awarding or paying a fee to the one or more users while hiring and recognizing the one or more experts from the feed.

Further, the method 330 may include executing, by a contract management subsystem, a contract between the user and the expert until completion of the one or more tasks. In one embodiment, executing a contract may include executing description of the task to be completed, one or more deliverable rules when the task is completed, and the like. In one specific embodiment, the method 330 may include counting the contract as an achieved goal and used for future calculation of ranking by the expert ranking measurement subsystem after completing the contract.

Further, the method 330 may include displaying, by a display subsystem, one or more profiles associated with the one or more users. In one embodiment, the method 330 may include managing one or more profiles using the display subsystem. In another embodiment, the method 330 may include displaying a history of the one or more tasks associated with the one or more users, a rank associated with the one or more experts, feed of the one or more users, and the like.

Figure 6:
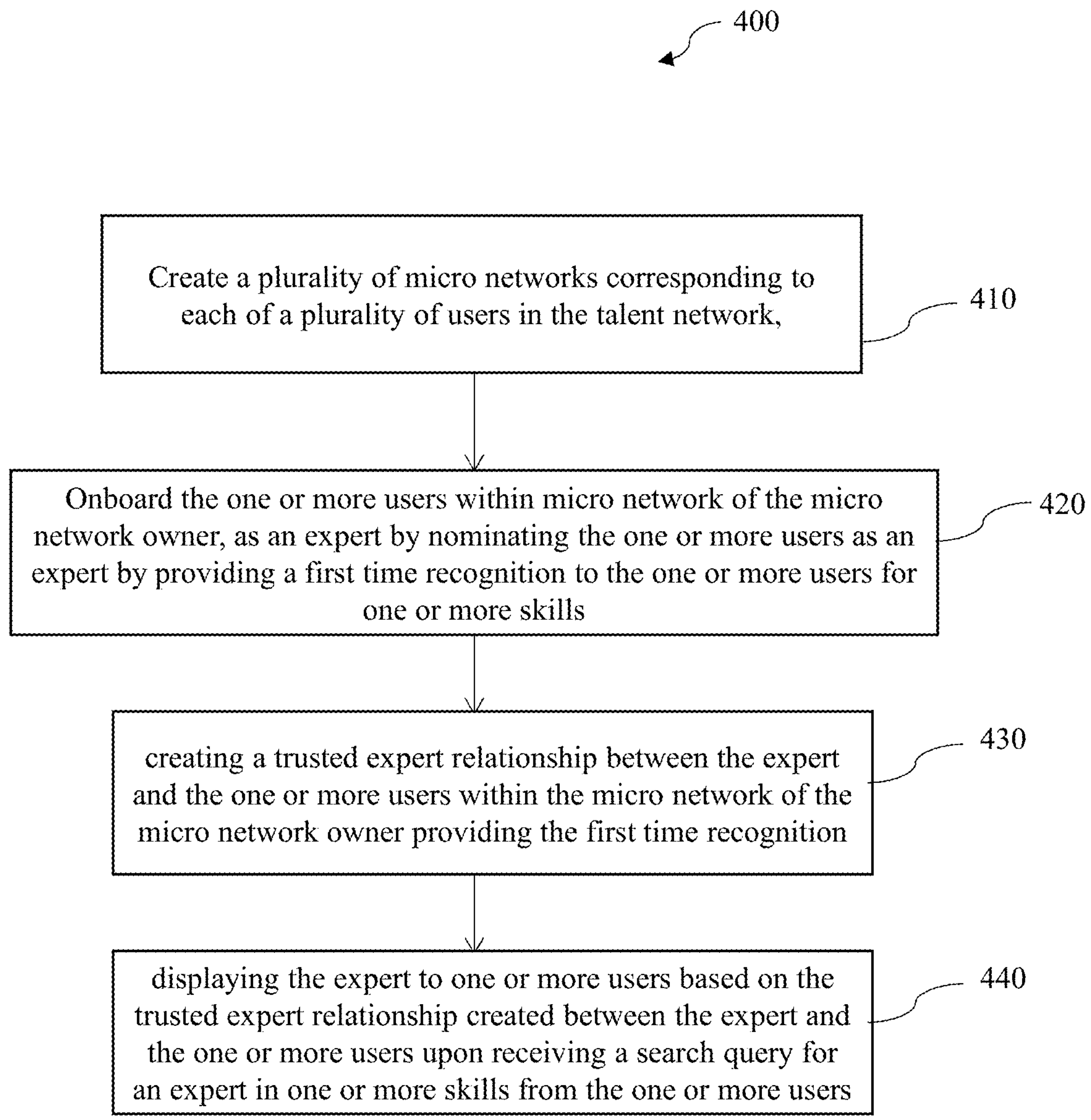
FIG. 6 is a flow diagram representing steps involved in a method for management of a talent network in accordance with an embodiment of the present disclosure.

FIG. 6 is a flow diagram representative of a method 400 for management of a talent network in accordance with an embodiment of the present disclosure. The method 400 includes creating a plurality of micro networks corresponding to each of a plurality of users in the talent network, wherein each micro network is owned by a corresponding micro network owner, and wherein each micro network comprises one or more users having a first degree of connection with the micro network owner in the talent network in step 410. The method 400 also includes onboarding the one or more users within micro network of the micro network owner, as an expert by nominating the one or more users as an expert by providing a first time recognition to the one or more users for one or more skills in step 420. In one embodiment, onboarding the one or more users within the micro network as the expert comprises onboarding an existing user of the talent network as the expert or a person unlisted in the talent network as the expert. In another embodiment, the method further includes receiving one or more recognitions associated with the expert for the one or more skills after receiving the first time recognition from one or more users in the micro network. The method 400 further includes creating a trusted expert relationship between the expert and the one or more users within the micro network of the micro network owner providing the first time recognition in step 430. In one embodiment, the method also includes creating the trusted expert relationship between the expert and the one or more users within the one or more micro networks of the corresponding one or more users providing recognitions to the expert after the first time recognition. The method 400 also includes displaying the expert to one or more users based on the trusted expert relationship created between the expert and the one or more users upon receiving a search query for an expert in one or more skills from the one or more users in step 440. In one embodiment, the method also includes adding one or more users in the micro network of the micro network owner using a gesture executed via a device.

Various embodiments of the present disclosure provide a technical solution to the problem for management of a talent network. The present system provides a seamless solution for providing a customized list of trusted and capable experts for performing various tasks, wherein the list of experts are sorted in accordance with an overall rank associated with each of the expert, which provides a great way of providing a likeability of each expert in solving a particular task. The current system calculates an overall rank of the expert in real-time, which makes the system efficient and precise.

While specific language has been used to describe the disclosure, any limitations arising on account of the same are not intended. As would be apparent to a person skilled in the art, various working modifications may be made to the method 230 (130) in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A method for management of a talent network comprising:

creating, by a processing subsystem running an executable program, a plurality of micro networks corresponding to each of a plurality of users in the talent network, wherein each micro network is owned by a corresponding micro network owner, wherein each micro network comprises one or more users having a first degree of connection with the micro network owner in the talent network, and wherein a new user is added to the first degree of connection of the micro network owner when a new user registers on the platform using the signal generated for the new user wherein the signal may include a link for registering on the platform;

onboarding, by the processing subsystem, the one or more users within the micro network of the micro network owner as an expert by nominating the one or more users as an expert by providing a first time recognition to the one or more users for one or more skills, wherein recognition is based on a list of tasks the one or more users have completed, the list of problems the one or more users have solved, and the like, wherein the first time recognition is provided to the first user who is within the first degree of connection of a second user in the talent network, and wherein the talent network comprises a blockchain-based contract management subsystem;

extracting, by a skill extraction subsystem, one or more skill sets from the one or more tasks completed by the one or more experts using one or more natural language processing techniques and one or more artificial intelligence techniques wherein the one or more tasks completed by the one or more experts are stored as a permanent record in a verifiable blockchain, wherein the one or more tasks are verified based on content provided by the one or more experts using the blockchain-based contract management subsystem;

creating, by the processing subsystem, a trusted expert relationship between the expert and the one or more users within the micro network of the micro network owner providing the first time recognition;

gesturing, by the one or more users handling a device, wherein the one or more users shares contact information with another user, and wherein the gesturing comprises at least one of moving the device up and down, shaking the device, and exchanging information between multiple devices via a wireless network;

generating, by an expert selection subsystem, a list of experts from the first degree of connection and the second degree of connection of the one or more users based on insights derived from the one or more recognitions received by the one or more experts using one or more machine learning algorithms and natural language processing techniques;

adding one or more users in the micro network of the micro network owner using a device-based gesture executed via the device, wherein the gesture includes at least one element of a set comprising moving the device, shaking the device, and moving the device within wireless communications range of a second device;

displaying, by the processing subsystem, the list of experts based on the trusted expert relationship created between the expert and the one or more users within the micro network upon receiving a search query for an expert in one or more skills from the one or more users, wherein the displaying the list of experts is performed by a display subsystem that displays one or more profiles associated with the one or more users, and wherein the one or more users manages one or more profiles using the display subsystem, and wherein the display subsystem displays at least one of a set comprising a history of one or more tasks associated with the one or more users, a rank associated with the one or more experts, and feed of the one or more users, and wherein the one or more users are connected via a network running on the processing subsystem comprising at least one of a Bluetooth wireless connection and a Near Field Communications (NFC) connection, and wherein the one or more users exchange information associated with at least one of user skills, problems with the users, user's contact information, and recognition information to establish the first degree of connection with the micro network owner in the talent network;

selecting, by the processing subsystem, the expert by the user from the displayed list of experts, wherein the user and the expert agrees to a blockchain-based smart contract for execution and completion of rules associated with the task; and executing, by the blockchain-based contract management subsystem, the blockchain-based smart contract between the user and the expert, wherein the blockchain-based smart contract includes a description of the task to be completed and one or more deliverable rules when the task is completed, wherein the blockchain-based smart contract is completed after agreement of the blockchain-based smart contract and completion of the task, and wherein after the agreement of the contract and the completion of the task, the blockchain-based smart contract is considered as completed and counted as an achieved goal and used for calculation of ranking and the completion of the task is stored on the verifiable blockchain.

2. The method of claim 1, wherein onboarding the one or more users within the micro network as the expert comprises onboarding an existing user of the talent network as the expert or a person unlisted in the talent network as the expert.

3. The method of claim 1, further comprising receiving one or more recognitions associated with the expert for the one or more skills after receiving the first time recognition from one or more users in the micro network.

4. The method of claim 3, further comprising creating the trusted expert relationship between the expert and the one or more users within the one or more micro networks of the corresponding one or more users providing recognitions to the expert after the first time recognition.

5. The method of claim 1, wherein onboarding the one or more users within the micro network as the expert is initiated by a request for recognition by the one or more users.

6. The method of claim 1, further comprising receiving one or more recognitions associated with one or more products from the one or more users in the micro network.

7. The method of claim 3, further comprising creating summaries of the one or more recognitions associated with the expert for the one or more skills and providing said summaries to the one or more users as a feed in the micro network.

8. The method of claim 6, wherein receiving the one or more recognitions is initiated by a request for recognition by the one or more users.

9. The method of claim 1 wherein the wireless communications is at least one of the Bluetooth connection and the Near Field Communications (NFC) connection.

10. The method of claim 1, further comprising using a trained machine learning model to generate weightages assigned to each user's case.

11. The method of claim 1, further comprising using a machine learning algorithm and natural language processing to drive insights from one or more recognitions received by the one or more experts.

* * * * *